United States Patent [19]

Ando

[11] Patent Number: 4,745,773
[45] Date of Patent: May 24, 1988

[54] APPARATUS OF MAKING SOFT ICE-DRINK

[75] Inventor: Toshio Ando, Kuwana, Japan

[73] Assignee: Chubu Industries, Inc., Kuwana, Japan

[21] Appl. No.: 82,411

[22] Filed: Aug. 6, 1987

[30] Foreign Application Priority Data

Mar. 11, 1987 [JP] Japan .................................. 61-57511
Mar. 11, 1987 [JP] Japan ............................. 61-36116[U]

[51] Int. Cl.⁴ ............................................. F25C 5/12
[52] U.S. Cl. ............................. 62/320; 241/DIG. 17; 366/601
[58] Field of Search ................. 62/320; 241/DIG. 17; 366/293, 297, 300, 601

[56] References Cited

U.S. PATENT DOCUMENTS

| | | | |
|---|---|---|---|
| 3,615,673 | 10/1971 | Summitt et al. | 62/320 X |
| 3,791,597 | 2/1974 | Walter et al. | 241/DIG. 17 |
| 3,837,587 | 9/1974 | Walter et al. | 241/DIG. 17 |
| 4,528,824 | 7/1985 | Herbert | 62/342 X |
| 4,653,281 | 3/1987 | Van Der Veer | 62/342 X |

*Primary Examiner*—William E. Tapolcai
*Attorney, Agent, or Firm*—Fulbright & Jaworski

[57] ABSTRACT

An apparatus of making a soft ice-drink comprises an ice mechanism, disposed on an apparatus bed, including a shaver casing having a slit to which a shaving blade is exposed and a shaved ice discharge chute, rotatable blades, provided within the shaver casing, for cooperating with the shaving blade to shave ice blocks charged into the shaver casing, and a first drive motor for rotating the rotatable blades, a mixing mechanism, disposed on the apparatus bed and under the ice shaving mechanism, including rotary blades, rotatably supported within a container disposed beneath the shaved ice discharge chute, for mixing together a liquid material such as a syrup present within the container and shaved ice pieces discharged into the container and smashing the shaved ice pieces into granules of ice, and a second drive motor for rotating the rotary blades at high speeds, and a control circuit for controlling operations of the first and second drive motors.

1 Claim, 3 Drawing Sheets

APPARATUS OF MAKING SOFT ICE-DRINK

BACKGROUND OF THE INVENTION

1. Field of the Invention

This invention relates to an apparatus of making a soft drink at relatively low temperatures by mixing a liquid material such as syrup, honey or fruit juice with shaved ice.

2. Description of the Prior Art

Conventionally, there has been available semi-refrigerated soft ice-drink as represented by, for example, sherbet in which a principal raw material such as fruit juice is semi-frozen. Fruit juice and milk charged into a refrigerator are cooled and stirred to thereby make the sherbet. Another making method is known wherein syrup and water are added with carbon-dioxide gas and frozen and bubbled with a refrigerator while being stirred to thereby prepare the sherbet.

In any conventional methods, however, a liquid drink material is stirred and cooled with a refrigerator so as to be partly iced and consequently a resulting drink, even if foam-like and soft, contains iced pieces which advantageously give an actual feeling of cold to tactile impression in the mouth when the consumer tastes the drink but contrarily, often give an uncomfortable feeling to the tongue.

Under the circumstances, the inventors of the present invention have already proposed a soft ice-drink making apparatus as disclosed in U.S. patent application Ser. No. 053,971 to solve the problems encountered in the conventional ice-drink making.

Summarily, the proposed soft ice-drink making apparatus comprises an ice shaving mechanism, disposed on an apparatus bed, including a shaver casing having a slit to which a shaving blade is exposed and a shaved ice discharge chute, rotatable blades, provided within the shaver casing, for cooperating with the shaving blade to shave ice blocks charged into the shaver casing, and a first drive motor for rotating the rotatable blades, and a mixing mechanism, disposed on the apparatus bed and under the ice shaving mechanism, including rotary blades, rotatably supported within a container disposed beneath the shaved ice discharge chute, for mixing together a liquid material such as syrup present within the container and shaved ice pieces discharged into the container and smashing the shaved ice pieces into granules of ice, and a second drive motor for rotating the rotary blades at high speeds. The proposed apparatus constructed as above has succeeded in solving the aforementioned problems.

In the proposed apparatus, however, the first and second drive motors are started substantially simultaneously. As a result, the shaved ice pieces stagnate at an upper part inside the container to form a partition wall, raising an unsolved problem that smashing of shaved ice pieces and mixing of shaved ice pieces with the liquid material are insufficiently done within the container.

SUMMARY OF THE INVENTION

An object of the present invention is to solve the problems raised by the proposed apparatus and provide an apparatus of making a soft ice-drink capable of smashing shaved ice pieces more sufficiently within the container and mixing the liquid material and shaved ice pieces smoothly.

According to the invention, to accomplish the above object, in the apparatus as disclosed in the aforementioned proposal, a control circuit is provided which controls operations of the first and second drive motors such that after the first drive motor has been started to operate, the second drive motor is started to operate and after the first drive motor has been stopped, the second drive motor is stopped.

In a soft ice-drink making apparatus of the above construction according to the invention, the first drive motor is first operated to prepare shaved ice pieces and after the shaved ice pieces are discharged into the container through the discharge chute and into the liquid material, the second drive motor is operated while the first motor continues to operate until it stops when discharging of a predetermined amount of shaved ice into the container is completed, and the second drive motor continues to operate after the first drive motor is stopped, whereby the rotary blades of the mixing mechanism can sufficiently smash and mix the shaved ice pieces with the liquid material present within the container, generating within the container a vertically-directed eddy-like whirling stream which traps ambient air rushing down to a lower part inside the container.

In accordance with an embodiment of the invention, the first and second drive motors and the control circuit for controlling operations of these motors are disposed in an enclosure forming part of the apparatus bed, and the control circuit includes first and second solid-state relays through which electric power is supplied to the first and second drive motors, these relays being disposed on a heat sink plate of high thermal conductivity which constitutes a base of the enclosure.

The solid-state relays are effective to supply electric power accurately and smoothly to the first and second drive motors but generate heat which, unless dissipated to the outside, transfers to ice shaving mechanism and mixing mechanism, adversely affecting the ice blocks, shaved ice and liquid material. Since in the embodiment the base of the enclosure comprises the heat sink plate through which the generated heat can be dissipated to the outside, there is no need of providing any additional special heat sink device.

DESCRIPTION OF THE PREFERRED EMBODIMENT

Ice Shaving Mechanism

Figure 1:
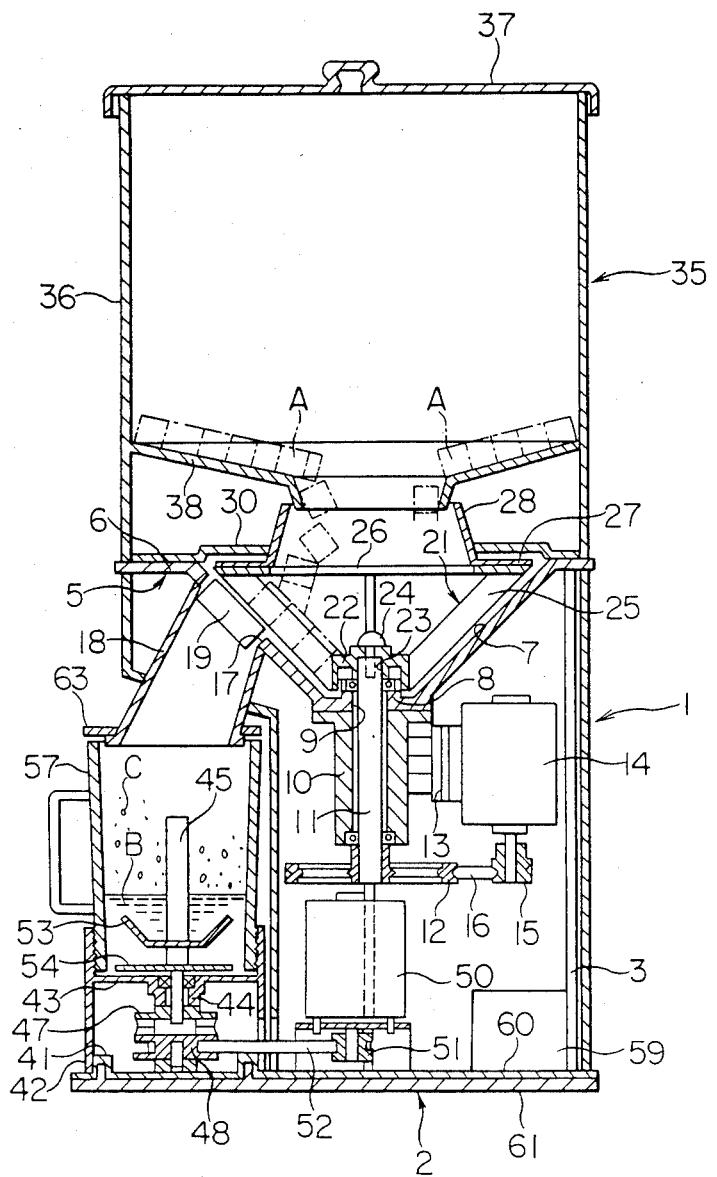
FIG. 1 is a longitudinal sectional front view showing an apparatus of making a soft ice-drink according to an embodiment of the invention.

Referring now to FIG. 1, an apparatus bed 1 has a base 2 and a plurality of struts 3 standing uprightly on the base 2. Detachably mounted to upper ends of these struts is a planar portion 6 of a frame 5 which is formed, at the remainder expecting the planar portion 6, into an inverted conical shaver casing 7. The space between base 2 and frame 5 is bordered by a circumferential wall, thus forming an enclosure 4.

The shaver casing 7 of the frame 5 has a central boss 8 with the back thereof fixedly mounted with the upper end of a cylindrical shaft housing 10 in which a rotary shaft 11 is journalled vertically, having its upper end passing through a center hole 9 in the boss 8 to project therefrom upwards and its lower end passing through the housing 10 to project therefrom downwards, the lower projecting portion of the rotary shaft 11 being fixedly mounted with a pulley 12. In the enclosure 4, a support arm 13 extends laterally of the housing 10 and a first electric motor 14 is attached to the support arm 13. An tensive belt 16 is applied on the pulley 12 and a pulley 15 fixed to the shaft of the motor 14.

Formed in the shaver casing 7 is an opening or slit 17 within which a shaving blade 19 is removably supported such that the amount of its projection into the shaver casing 7 is adjustable. A shaved ice discharge chute 18 contiguous to the opening 17 is provided on the shaver casing 7.

The rotary shaft 11 passing through the center hole 9 in the boss 8 has the upper projecting portion which is slidably inserted in a center recess 23 formed in the lower surface of a boss 22 of a transfer rotor 21, and the rotary shaft 1 is removably and securely connected to the boss 22 by means of a bolt 24. The transfer rotor 21 comprises several blades 25 which extend radially from the boss 22 with their bottom surfaces opposing the top surface of the shaver casing 7 in substantially parallel relationship therewith, an annular plate 26 which connects tips of the blades 25 together, and a hopper 28 having a flange 27 which extends outwards from the lower circumferential skirt of the hopper and at which the hopper 28 is removably and securely mounted to the annular plate 26 by means of setscrews not shown. A water-proof cover 30 abutting against the circumferential periphery of the hopper 28 is mounted on the planar portion 6.

The ice shaving mechanism is structurally identical to that of the aforementioned proposal as far as members described above are concerned but especially in the present embodiment, an ice block reservoir 35 is detachably mounted to the planar portion 6 by means of, for example, bolts not shown. The reservoir 35 comprises a cylindrical transparent circumferential wall 36, a lid 37 removably mounted on the upper end of the circumferential wall 36, and a funnel-like wall 38 secured to the inner side of the circumferential wall 36 and having an opening which is in communication with the hopper 28.

Mixing Mechanism

Under the discharge chute 18, an engaging projection 41 is provided on the base 2 and a cylindrical container stand 42 for engagement with the engaging projection 41 is removably mounted on the base 2. An intermediate partition wall 43 extends from the inner circumferential wall of the container stand 42 and has a center boss 44 in which a rotary shaft 45 is journalled vertically, having its upper end passing through a center hole in the boss 44 to project upwards and its lower end likewise passing through the center hole to project downwards, the downward projecting portion of the rotary shaft 45 being fixedly mounted with an upper coupling 47.

A lower coupling 48, disposed beneath the upper coupling 47 and being engagable and disengagable therewith, is rotatably supported on the base 2.

Within the enclosure 4, on the other hand, a second electric motor 50 and a control unit 59 are disposed. An tensive belt 52 is applied on the coupling 48 and a pulley 51 fixed to the shaft of the motor 50. The base 2 is comprised of an upper aluminum plate of high thermal conductivity acting as a heat sink and a lower metal plate 61.

The rotary shaft 45 has its upper end, a square form in horizontal crosssection, which extends upwards nearby the opening of the container 57 and its lower end which fixedly carries an upper rotary blade 53 for mixing and a lower knife-like rotary blade 54 for smashing which is vertically spaced apart from the upper rotary blade 53. The upper inner circumferential end of the container stand 42 meshes with the lower outer circumferential end of the container 57 in water-tight fashion. In the present embodiment, a soft lid 63 is detachably mounted to a lower end portion of the chute 18 to prevent the contents in the container 57 from scattering to the outside.

Figure 2:
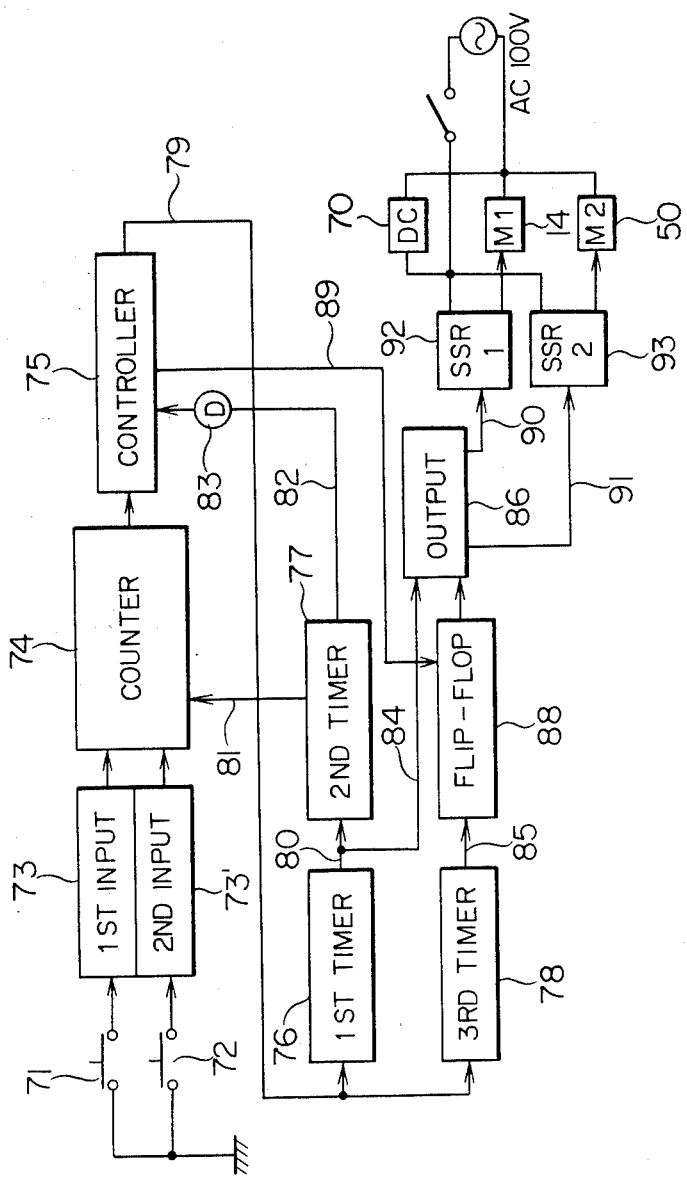
FIG. 2 is a block diagram illustrating an exemplary control circuit used in the apparatus of FIG. 1 embodiment.

FIG. 2 illustrates, in block form, a control circuit for drive motors 14 and 50 which is incorporated in the control unit 59.

First and second switches 71 and 72 are selectively used to make a soft ice-drink for one helping or two helpings. The second switch 72 as used of two may be altered in design for more than two so as to essentially accommodate itself to plural helpings which can not be attained by the switch 71 for one. One end of each of the first and second switches 71 and 72 is connected to ground through a suitable DC power supply circuit 70 (not shown in this connection and will be described later) which is also used for feeding the other elements of the control circuit through lines not shown.

Signals generated by the first and second switches 71 and 72 are respectively supplied to first and second input circuits 73 and 73' each of which comprises a noise elimination circuit and tristate buffer and serves to prevent erroneous operations due to noises and reception of additional input signals during operation. Connected to the first and second input circuits 73 and 73' is a counter 74 of two channels respectively used for one helping and two helpings, having the output connected to a controller 75. First and third timers 76 and 78 are connected, at one end, in common to the controller 75 through a line 79 and the first timer 76 is connected in series with a second timer 77 through a line 80.

The second timer 77 is connected to the counter 74 and the controller 75 through lines 81 and 82, respectively, and a delay circuit 83 is inserted in the line 82.

The first timer 76 is connected to an output circuit 86 through a line 84 and the third timer 78 is connected to the output circuit 86 through a line 85 in which a flip-flop 88 is inserted. The flip-flop 88 is connected to the controller 75 through a line 89.

The output circuit 86 is connected to the first and second drive motors 14 and 50 through lines 90 and 91 in which first and second solid-state relays 92 and 93 are inserted. When a main switch is turned on, the control circuit is activated and the motors 14 and 50 are ready for being fed through the relays 92 and 93 from an AC power supply of 100 V, with the AC power supply connected in parallel with the DC power supply circuit 70 through the main switch.

Figure 3:
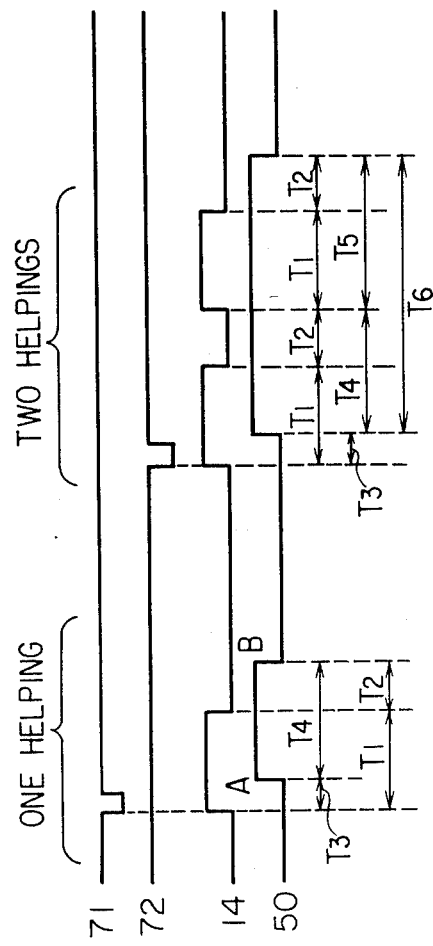
FIG. 3 is a time chart useful in explaining the operation of the control circuit.

The operation of the foregoing embodiment will now be described with reference to a time chart of FIG. 3.

The lid 37 is first removed and ice blocks A such as in cubic form are charged, by a great number, into the reservoir 35. The lid 37 is then closed.

Subsequently, the container 57 along with the container stand 42 is removed from the base 2 and an appropriate amount of liquid material B such as syrup is poured into the container 57. Thereafter, the container 57 along with the container stand 42 is supportingly placed on the base 2 such that the upper coupling 47 is brought into engagement with the lower coupling 48. After completion of the preparatory procedure as such, the main switch is turned on. Then, for making a drink for one, the first switch 71 is turned on. Under this condition, a signal is delivered out of the first input circuit 73 and sets a count "1" in one channel of the counter 74. A high level signal representative of the count "1" is inputted to the controller 75 so that the controller 75 produces a high level signal which is applied to the first timer 76 and the third timer 78. The rising edge of the high level signal from the controller 75 triggers the first timer 76, and a high level signal is produced from the first timer 76 during an interval of time T1 preset for the timer 76 and applied to the output circuit 86. Then the output circuit 86 energizes the first solid-state relay 92 and the first motor 14 is rotated under the application of AC 100 V. In this manner, the first motor 14 is operated during the interval of time T1 to permit the shaving blade to shave the ice blocks A and the thus shaved ice pieces C are discharged into the liquid material B present within the container 57.

At the expiration of the interval of time T1, the output signal of the first timer 76 falls to a low level and the first relay 92 is deenergized, thereby stopping the first motor 14. The falling edge of this output signal of the first timer 76 triggers the second timer 77 and a high level signal is produced from the second timer 77 during an interval of time T2 preset for this timer 77. At the expiration of the interval of time T2, the output signal of the second timer 77 falls to a low level and the falling edge of this signal resets the counter 74 (one channel) to a low level. The controller 75 is triggered by the falling edge, delayed through the delay circuit 83, to match the issuance of the low level signal from the counter 74 and produces a low level signal on the line 89.

On the other hand, the third timer 78 also responds to the rising edge of the high level signal produced on the line 79 from the controller 75 to produce a high level signal during an interval of time T3 preset for the timer 78. At the expiration of the interval of time T3, the falling edge of the output signal from the third timer 78 triggers the flip-flop 88 and a high level output signal is produced from the flip-flop 88 and applied to the output circuit 86. Then the output circuit 86 energizes the second solid-state relay 93 and the second motor 50 is rotated under the application of AC 100 V. Consequently, the rotary blades 53 and 54 are started to rotate at high speeds, thereby ensuring that the shaved ice pieces C and liquid material B can be urged to run as a vertically-directed eddy-like whirling stream which, within the container 57, drops depressively at the center to generate air bubbles and whirls and rises at the outer side. As a result, the shaved ice pieces C are smashed or further granulated and mixed with the liquid material B.

As the operation of the second motor 50 proceeds, the low level signal is delivered from the controller 75 to the flip-flop 88 through the line 89 at the termination of the interval of time T2 set for the second timer 77 as described previously and the flip-flop 88 is reset to a low level. In this manner, the second motor 50 can rotate during an interval of time T4 and stop at the termination of the interval of time T2.

When the soft ice-drink has been prepared which is a mixture of the liquid material B and granulated, shaved ice C as well as air bubbles, the container 57 along with the container stand 42 is removed from the base 2 by releasing the engagement of the coupling 47 with the coupling 48 and the drink within the container 57 is poured into a cup for services.

Since the ice blocks A are initially shaved by the shaving blade 19 and resulting shaved ice C is discharged to above the liquid material B present within the container 57 before the rotary blades 53 and 54 are started to rotate, scattering of the liquid material B to the outside of the container 57 can be prevented and the shaved ice C can be charged into the liquid material B without being affected by the rotary blades 53 and 54, with the result that the shaved ice can gradually settle down nearby the bottom of the container, without stagnating at an upper part inside the container to form a so-to-speak partition wall. Therefore, when the rotary blades 53 and 54 are subsequently rotated, the shaved ice can be smashed sufficiently and mixed with the liquid material B satisfactorily.

The thus prepared drink is removed of the feeling due to the existence of iced pieces and is so soft that it gives a very comfortable feeling to the tongue, exhibiting the intermediate quality between conventional cream and sherbet. Further, the granules of shaved ice in the drink are trapped in bubbles and so they are difficult to dissolve. Consequently, the drink can remain sufficiently cooled until it is served for consumers after poured into a cup.

Next, when making an ice-drink for two, the second switch 72 is turned on.

Under this condition, a signal is delivered out of the second input circuit 73' and sets a count of "2" in the other channel of the counter 74. As in the precedence, the controller 75 responds to the count and produces the high level signal which is applied to the first and third timers 76 and 78.

Through a similar operation to that for one helping, the first motor 14 is temporarily stopped at the expiration of the interval of time T1 and the falling edge of the signal delivered out of the second timer 77 at the expiration of the preset interval of time T2 is applied to the counter 74 (the other channel) and the controller 75. But in this case of two helpings, the counter 74 is simply advanced by one and is not reset because the other "1" remains, thereby producing the high level signal and so the controller 75 produces the high level signal which is again applied to the first and third timers 76 and 78. Then the first motor 14 is operated during the second occurrence interval of time T1 and stopped at the termination of the second occurrence interval of time T1.

At the beginning of the second occurrence interval of time T1, the signal supplied from the controller 75 to the flip-flop 88 still remains high and the second motor 50, started to operate at the expiration of the interval of time T3, continues to operate.

At the termination of the second occurrence interval of time T2 at which an interval of time T5 equalling the sum of the second occurrence interval of time T1 and the second occurrence interval of time T2 has expired, the falling edge of the signal delivered out of the second timer 77 resets the counter 74 and as in the case of one helping, the controller 75 produces the low level signal which resets the flip-flop 88, thereby stopping the second motor 50.

In this manner, at the expiration of the interval of time T3 after the commencement of the ice shaving process, the mixing process is started and thereafter the ice shaving process is temporarily stopped for time T2 until the interval of time T4 has expired but the mixing process continues to proceed. Subsequently, the ice shaving process is restarted to continue during the second occurrence interval of time T1 and at the expiration of the second occurrence interval of time T2 following the completion of the ice shaving process, the mixing process which has continued over an interval of time T6 in total ends.

Where a drink for three helpings, a drink for one may be added to the channel for two in a similar way as described in connection with FIG. 3. Thus, making a drink for more than three can be accomplished in the same way.

Unless the ice shaving process is temporarily stopped in the case of making a drink for plural helpings, the shaved ice is continuously discharged into the container and sufficient smashing and mixing tend to be prevented. Therefore, in the ice-drink making procedure described previously, the ice shaving is carried out intermittently at the rate of a drink for one while the motor 50 is continuously operated to continue smashing and mixing, thereby ensuring that sufficient smashing and mixing can be carried out each time the shaved ice for one helping is discharged into the container.

Since in the foregoing embodiment the first and second motors 14 and 50 are fed from the AC power supply through the solid-state relays 92 and 93, the requisite amount of current can be supplied to the two motors accurately and smoothly. Further, in consideration of the fact that the solid-state relays 92 and 93 used in the power supply circuits generate a great amount of heat and adversely affect the whole of apparatus in the absence of a heat sink, the base 2 comprises, in the present embodiment, the upper plate 60 made of aluminum and this upper plate, on which the solid-state relays 92 and 93 are disposed, can serve as a heat sink, thus succeeding in dispensing with any additional special heat sink.

Although a particular preferred embodiment of the invention has been disclosed in detail for illustrative purposes, it will be recognized that variations or modifications of the dislosed apparatus, including the rearrangement of parts, lie within the scope of the present invention.

What is claimed is:

1. In an apparatus of making a soft ice-drink comprising:

an ice shaving mechanism, disposed on an apparatus bed, including a shaver casing having a slit to which a shaving blade is exposed and a shaved ice discharge chute, rotatable blades, provided within said shaver casing, for cooperating with said shaving blade to shave ice blocks charged into said shaver casing, and a first drive motor for rotating said rotating blades; and a mixing mechanism, disposed on said apparatus bed and under said ice shaving mechanism, including rotary blades, rotatably supported within a container disposed beneath said shaved ice discharge chute, for mixing together a liquid material such as syrup present within said container and shaved ice pieces discharged into said container and smashing the shaved ice pieces into granules of ice, and a second drive motor for rotating said rotary blades at high speeds;

the improvement which comprises a control circuit for controlling operations of said first and second drive motors such that after said first drive motor has been started to operate and after said first drive motor has been stopped, said second drive motor is stopped, said control circuit comprises switch input means respectively provided corresponding to drinks for different helpings and producing signals representative of the different helpings, a counter connected to the outputs of said switch input means, a controller connected to the output of said counter, first and third timers each having one end connected in common to the output of said controller, a second timer connected to the output of said first timer and a flip-flop connected to the output of said third timer, said first and second drive motors being respectively connected to said first timer and flip-flop and driven by high level signals delivered out of said first timer and flip-flop, whereby said counter is set with "count" signals by said switch input means to deliver a high level signal to said controller, said controller receiving the high level signal delivers a high level signal to said first and third timers which in turn produce high level signals during intervals of time respectively present for said first and third timers, and said second timer produces, at the expiration of the interval of time preset for said first timer, a high level signal during an interval of time preset for said second timer and resets said counter and triggers said controller at the expiration of the interval of time preset for said second timer so that said counter produces a low level signal and said controller responds to the low level signal to deliver to said flip-flop a low level signal which resets said flip-flop and causes it to deliver a low level signal.

* * * * *

UNITED STATES PATENT OFFICE
CERTIFICATE OF CORRECTION

Patent No. 4,745,773          Dated May 24, 1988

Inventor(s) Toshio Ando

It is certified that error appears in the above-identified patent and that said Letters Patent are hereby corrected as shown below:

Column 2, line 62, delete "expecting" and insert -- excepting --

Column 3, line 21, change "1" to -- 11 --

Column 4, line 19, delete "of" and insert -- for --

Column 7, line 39, delete "dislosed" and insert -- disclosed --

Column 8, line 2, delete "rotating" and insert -- rotatable --

Column 8, line 16, after "operate" insert -- , said second drive motor is started to operate --

Signed and Sealed this

Thirteenth Day of December, 1988

*Attest:*

DONALD J. QUIGG

*Attesting Officer*     *Commissioner of Patents and Trademarks*